United States Patent
Kuo et al.

(10) Patent No.: US 8,283,617 B2
(45) Date of Patent: Oct. 9, 2012

(54) DISPLAY DEVICE AND LIGHT SENSING SYSTEM

(75) Inventors: Meng-Hsin Kuo, Taipei County (TW); Chia-Hsi Tsai, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 505 days.

(21) Appl. No.: 12/398,183

(22) Filed: Mar. 5, 2009

(65) Prior Publication Data

US 2010/0224758 A1  Sep. 9, 2010

(51) Int. Cl.
 *G06F 3/042* (2006.01)
(52) U.S. Cl. ........ 250/203.1; 250/330; 250/338.1; 250/341.8; 250/202; 359/589
(58) Field of Classification Search .......... 250/338.1
 See application file for complete search history.

(56) References Cited

U.S. PATENT DOCUMENTS

| | | | | |
|---|---|---|---|---|
| 5,442,147 A * | 8/1995 | Burns et al. | ............. | 178/18.09 |
| 5,503,904 A * | 4/1996 | Yoshinaga et al. | ......... | 428/195.1 |
| 6,899,275 B2 * | 5/2005 | Schramm | ................ | 235/487 |
| 7,491,424 B2 * | 2/2009 | Hersch et al. | ............. | 427/267 |
| 7,536,557 B2 * | 5/2009 | Murakami et al. | ........ | 713/186 |
| 7,622,182 B2 * | 11/2009 | Wang et al. | .............. | 428/204 |
| 7,663,608 B2 * | 2/2010 | Sui et al. | ................. | 345/173 |
| 7,864,428 B2 * | 1/2011 | Chen et al. | .............. | 359/590 |
| 7,889,399 B1 * | 2/2011 | Lynch et al. | ............. | 358/488 |
| 2004/0085301 A1 * | 5/2004 | Furukawa et al. | ......... | 345/179 |
| 2004/0121298 A1 * | 6/2004 | Creamer et al. | .......... | 434/322 |
| 2005/0243369 A1 * | 11/2005 | Goldstein et al. | .......... | 358/1.18 |
| 2006/0139338 A1 * | 6/2006 | Robrecht et al. | .......... | 345/175 |
| 2007/0276694 A1 * | 11/2007 | Moriyama | ................. | 705/2 |
| 2007/0281136 A1 * | 12/2007 | Hampden-Smith et al. | ....... | 428/195.1 |
| 2007/0290047 A1 * | 12/2007 | Tazaki et al. | ............. | 235/491 |
| 2008/0181501 A1 * | 7/2008 | Faraboschi et al. | ......... | 382/179 |
| 2008/0233360 A1 * | 9/2008 | Sekine et al. | ............. | 428/195.1 |
| 2008/0252064 A1 * | 10/2008 | Sekine et al. | ............. | 283/91 |
| 2008/0273816 A1 * | 11/2008 | Chen et al. | .............. | 382/321 |
| 2009/0014526 A1 * | 1/2009 | Rusman et al. | ........... | 235/470 |
| 2009/0073502 A1 * | 3/2009 | Ishizaki | .................. | 358/445 |
| 2009/0087017 A1 * | 4/2009 | Onishi et al. | ............. | 382/100 |
| 2009/0279170 A1 * | 11/2009 | Miyazaki et al. | .......... | 359/488 |
| 2010/0181020 A1 * | 7/2010 | Hill et al. | ................ | 156/249 |
| 2011/0011925 A1 * | 1/2011 | Yoshida | ................... | 235/375 |
| 2011/0149317 A1 * | 6/2011 | Diaz Lopez | .............. | 358/1.9 |

* cited by examiner

*Primary Examiner* — David Porta
*Assistant Examiner* — Djura Malevic
(74) *Attorney, Agent, or Firm* — Li&Cai Intellectual Property (USA) Office

(57) ABSTRACT

A display device is applied to a light sensing system. The display device includes a display module and a pattern layer. The pattern layer is made of optical material and formatted on the display module. The pattern layer includes patterned optical material and gaps without optical material. The pattern layer selectively reflects or absorbs invisible light with specific wavelength emitted from the display module, such that a light sensor cannot sense the invisible light reflected or absorbed by the optical material or just can sense a little invisible light through the optical material. However, the invisible light can be emitted out of the gaps without the optical material, such that the light sensor can selectively sense the invisible light. Based on the light sensing result, the light sensor can recognize the corresponding pattern.

20 Claims, 11 Drawing Sheets

DISPLAY DEVICE AND LIGHT SENSING SYSTEM

BACKGROUND OF THE INVENTION

1. Field of the Invention

The invention relates to a display device and, more particularly, to a display device comprising a pattern layer capable of selectively reflecting or absorbing invisible light (e.g. infrared light). Furthermore, the invention relates to a light sensing system utilizing the aforesaid display device.

2. Description of the Prior Art

Touch panels nowadays are gaining popularity for numerous applications including point-of-information kiosks, vending, electronic catalogs, in-store locators, corporate training, gaming, banking/financial transactions, ticket sales, and the like. A touch panel generally employs one of four types of touch technologies: capacitive, resistive, optics, and surface acoustic wave (SAW).

For large size display, the capacitive or resistive touch panel has higher cost and the optics or SAW touch panel has worse resolution and easily suffers influences. Therefore, it is necessary to provide a solution with low cost and high resolution to solve the aforesaid problems.

SUMMARY OF THE INVENTION

The invention provides a display device comprising a display module and a pattern layer. The pattern layer is made of optical material and formatted on the display module. The pattern layer comprises patterned optical material and gaps without optical material. The pattern layer is capable of selectively reflecting or absorbing invisible light with specific wavelength emitted from the display module, such that a light sensor cannot sense the invisible light reflected or absorbed by the optical material or just can sense a little invisible light through the optical material. However, the invisible light can be emitted out of the gaps without the optical material, such that the light sensor can selectively sense the invisible light. Based on the light sensing result, the light sensor can recognize the corresponding pattern.

The invention further provides a light sensing system comprising a display device and a pointing device. The display device comprises a display module and a pattern layer. The pattern layer is made of optical material and formatted on the display module. The pattern layer comprises patterned optical material and gaps without optical material. The pattern layer is capable of selectively reflecting or absorbing invisible light with specific wavelength emitted from the display module. The pointing device comprises a light sensing unit for selectively sensing a predetermined pattern associated with a specific position on the pattern layer. The predetermined pattern is formed by the invisible light with specific wavelength emitted out of the gaps without optical material. In other words, the light sensing unit cannot sense the invisible light reflected or absorbed by the optical material or just can sense a little invisible light through the optical material. However, the invisible light can be emitted out of the gaps without the optical material, such that the light sensor can selectively sense the invisible light. Based on the light sensing result, the light sensor can recognize the corresponding pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
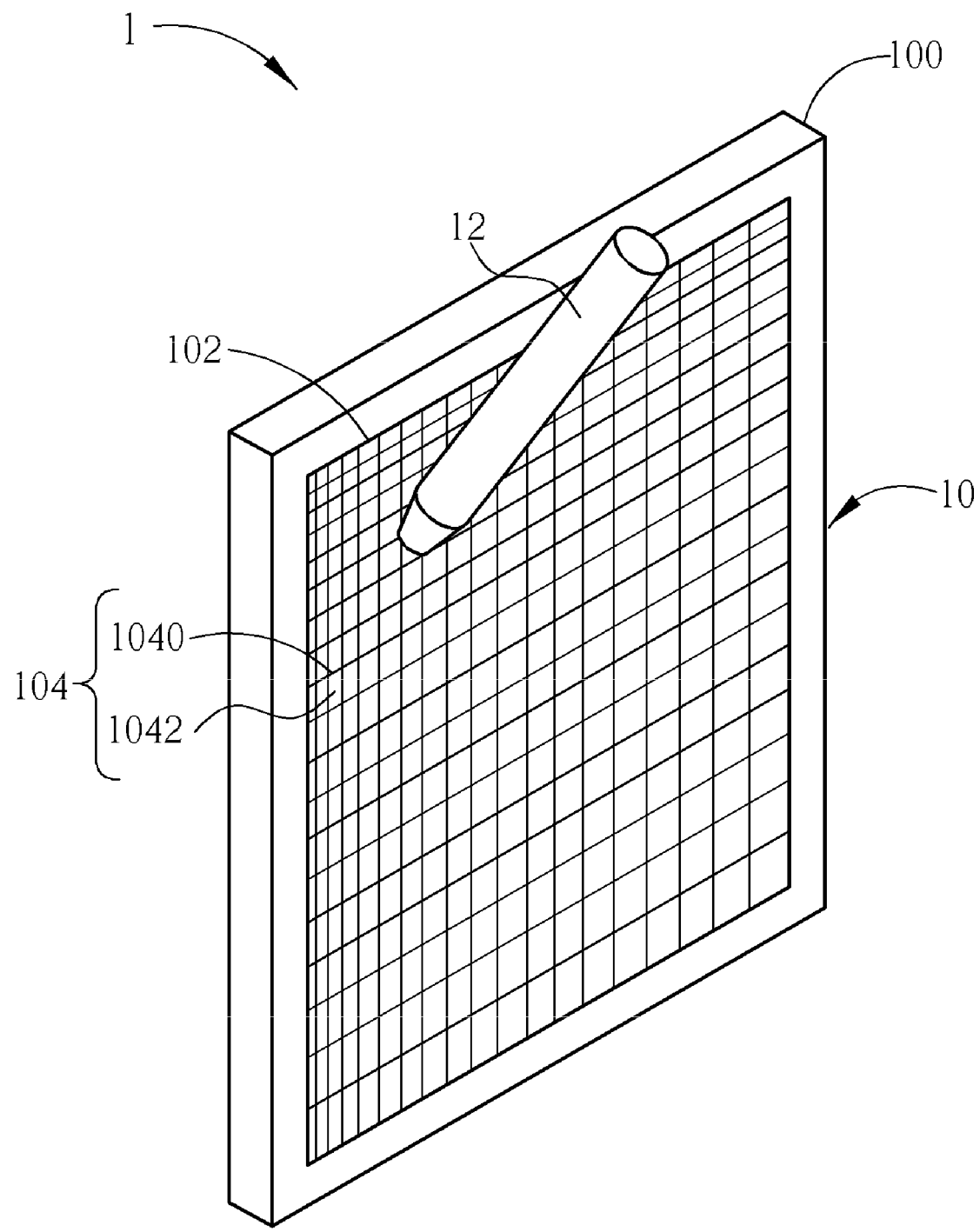
FIG. 1 is a schematic diagram illustrating a light sensing system according to an embodiment of the invention.
Figure 2:
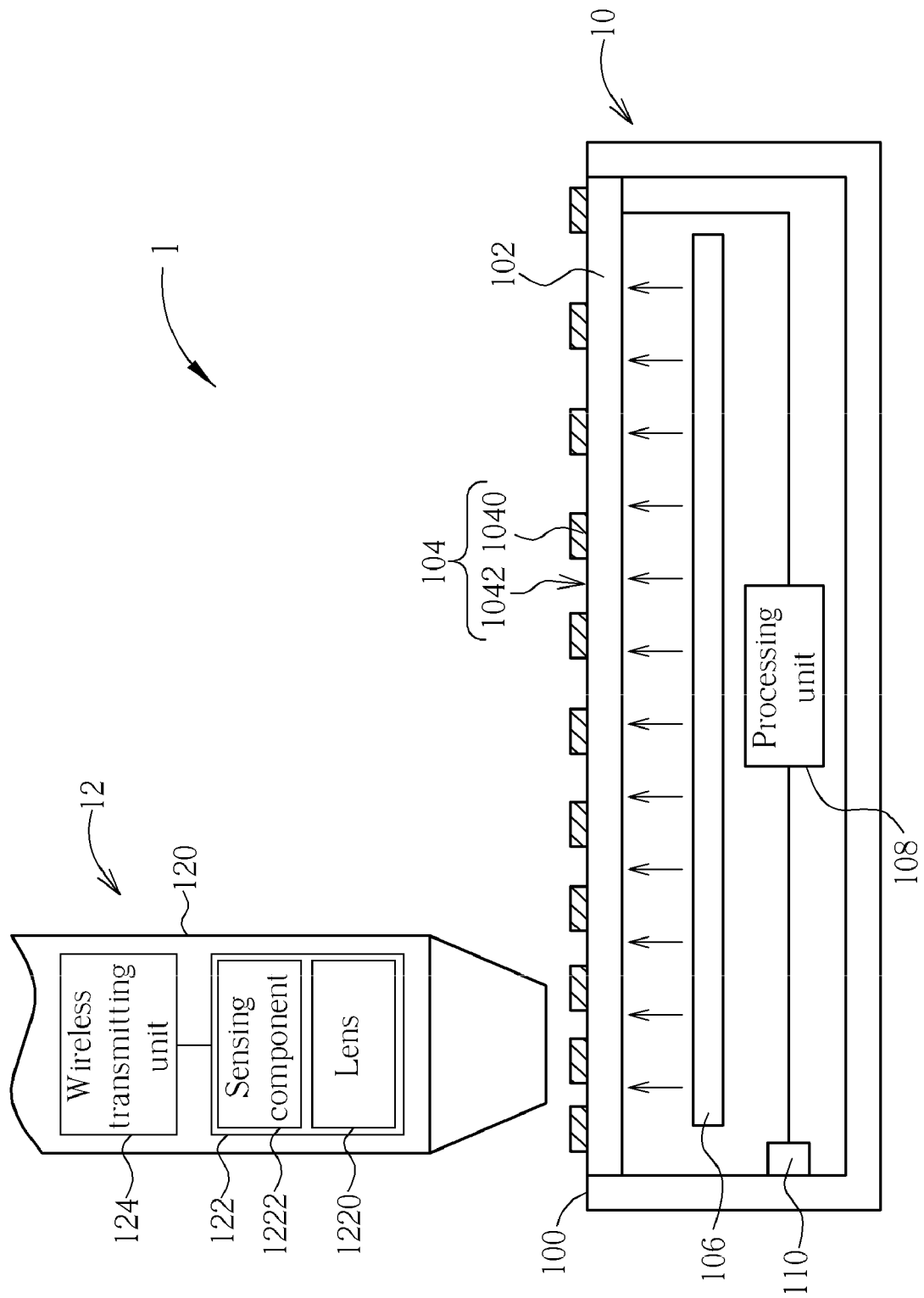
FIG. 2 is a schematic diagram illustrating the elements of the light sensing system shown in FIG. 1.
Figure 3:
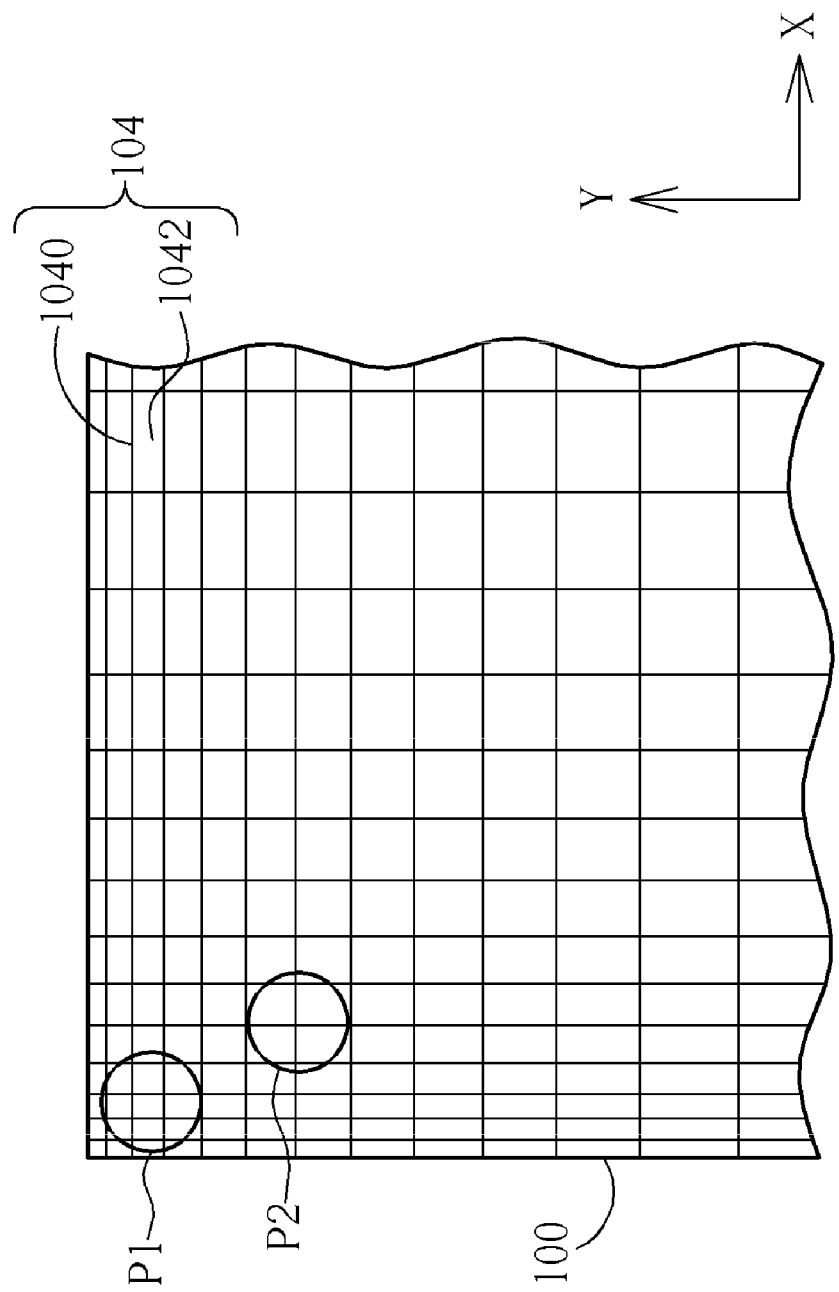
FIG. 3 is a partial front view illustrating the display module shown in FIG. 1.

Referring to FIGS. 1 and 2, FIG. 1 is a schematic diagram illustrating a light sensing system 1 according to an embodiment of the invention, and FIG. 2 is a schematic diagram illustrating the elements of the light sensing system 1 shown in FIG. 1. The light sensing system 1 comprises a display device 10 and a pointing device 12. The display device 10 can be a liquid crystal display (LCD), a plasma display panel (PDP), an organic light emitting display (OLED), or the like. As shown in FIGS. 1 to 3, the display device 10 substantially comprises a first casing 100, a display module 102, a pattern layer 104, and a processing unit 108. The pattern layer 104 is made of optical material 1040 and formatted on the display module 102, wherein the optical material 1040 of the pattern layer 104 is selected from a group consisted of material capable of reflecting invisible light, material capable of absorbing invisible light, material allowing partial invisible light to pass through, and a combination thereof. For example, the invisible light can be, but not limited to, infrared light. In this embodiment, the pattern layer 104 comprises patterned optical material 1040 and gaps 1042 without optical material. Therefore, the optical material 1040 of the pattern layer 104 can selectively reflect or absorb invisible light with specific wavelength emitted by a light emitting unit 106 or the display module 102. However, the invisible light can be emitted out of the gaps 1042 without the optical material of the pattern layer 104.

It should be noted that the aforesaid optical material 1040 of the pattern layer 104 just selectively reflects or absorbs the invisible light with specific wavelength without influencing the visible light. In other words, though the pattern layer 104 is disposed on the display module 102, it does not block image frames displayed by the display module 102.

The light emitting unit 106 and a wireless receiving unit 110 can be selectively disposed in the display device 10. The pointing device 12 substantially comprises a second casing 120 and a light sensing unit 122. A wireless transmitting unit 124 can be selectively disposed in the pointing device 12. The light sensing unit 122 can comprise a lens 1220, a sensing component 1222 (e.g. CCD, CMOS, or the like) for sensing invisible light with specific wavelength (e.g. infrared light), and/or other optical components (not shown). The display device 10 can communicate with the pointing device 12 in wire or wireless manner.

If the display device 10 is an LCD, the display module 102 (e.g. liquid crystal panel), the light emitting unit 106, the processing unit 108, and the wireless receiving unit 110 are disposed in the first casing 100, the pattern layer 104 is formed on the display module 102, and the light emitting unit 106 is disposed at one side of the display module 102. It should be noted that the pattern layer 104 also can be formed on the other side of the display module 102 and is not limited to the type shown in FIG. 2. Furthermore, though the light emitting unit 106 shown in FIG. 2 is disposed below the display module 102 (e.g. direct type backlight), the invention is not limited to the type shown in FIG. 2. That is to say, the light emitting unit 106 can be disposed at any side surrounding the display module 102 in an LCD as long as the image frames displayed by the liquid crystal panel are visible. The light emitting unit 106 can be a light emitting diode module, a backlight module, or other light sources capable of emitting light. Moreover, if the display device 10 is a PDP or OLED, it can emit light by itself without the aforesaid light emitting unit 106 since PDP or OLED is an emissive display. The function and principle of PDP or OLED have been known by one skilled in the art, so the related description does not be described here.

In summary, the invention utilizes the pattern layer 104 formed on the display module 102 to selectively reflect or absorb the invisible light with specific wavelength (e.g. infrared light) emitted from the light emitting unit 106 or the display module 102, such that the sensing component 1222, which is capable of sensing the invisible light with specific wavelength, can sense or read predetermined pattern or text corresponding to a specific position, wherein the sensed pattern or text may represent a coordinate data or a specific implication. After converting the sensed pattern or text into the coordinate data or specific implication, pointing or other predetermined functions can be performed on the display device. For further description, since the sensing component 1222 is used to sense invisible light with specific wavelength, it cannot sense the invisible light reflected or absorbed by the optical material 1040 or just can sense a little invisible light through the optical material 1040. That is to say, the brightness sensed by the sensing component 1222 is low. On the other hand, if the invisible light is emitted out of the gaps 1042 without the optical material, the brightness sensed by the sensing component 1222 is high. Based on the light sensing result, the sensing component 1222 can sense or read a pattern or text corresponding to a specific position over the pattern layer 104.

As shown in FIGS. 1 and 2, the pointing device 12 can be used to indicate a specific position over the display module 102 of the display device 10. At this time, the light sensing unit 122 of the pointing device 12 will sense a predetermined pattern corresponding to the specific position, wherein the predetermined pattern is formed by the invisible light with specific wavelength emitted out of the gaps 1042 without optical material. Afterward, the wireless transmitting unit 124 of the pointing device 12 outputs a sensing result to the wireless receiving unit 110 of the display device 10. After receiving the sensing result by the wireless receiving unit 110, the processing unit 108 converts the sensing result into a coordinate data or a specific implication. It should be noted that the type of the sensing result varies based on the property and arrangement of the optical material 1040 of the pattern layer 104.

In this invention, the optical material 1040 of the pattern layer 104 can be selected from a group consisted of material capable of reflecting invisible light, material capable of absorbing invisible light, material allowing partial invisible light to pass through, and a combination thereof. Furthermore, the optical material 1040 of the pattern layer 104 can be distributed on the display module 102 uniformly or in a specific density.

Figure 4:
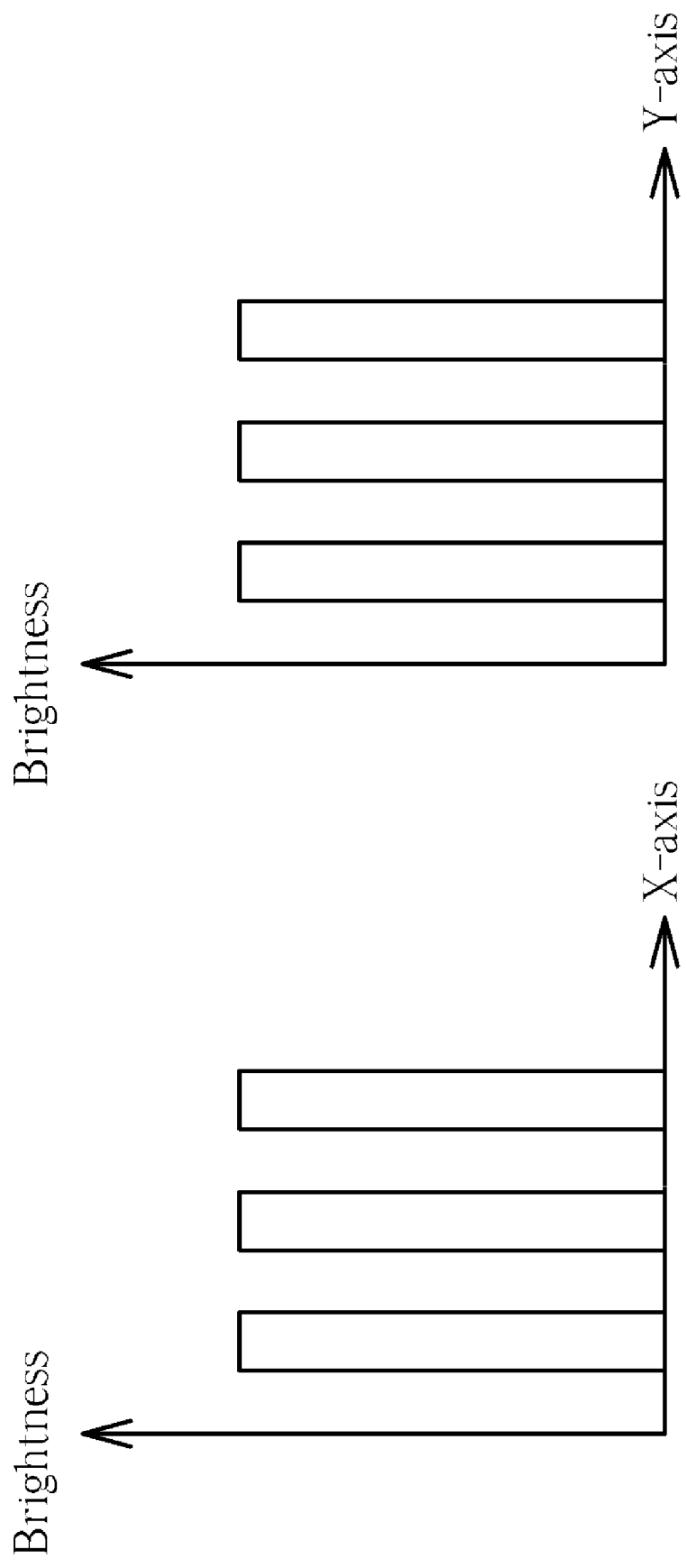
FIG. 4 is a schematic diagram illustrating a sensing result sensed by the light sensing unit at a specific position.
Figure 5:
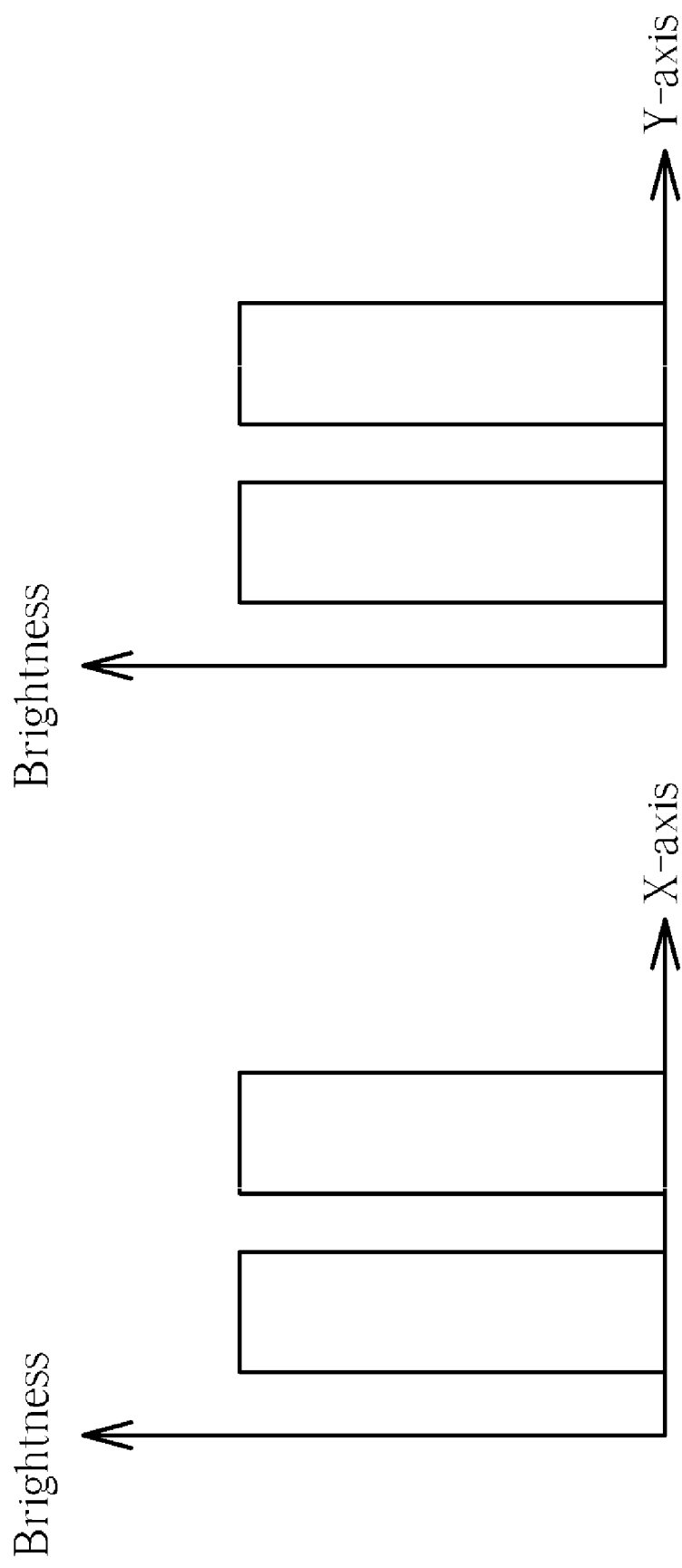
FIG. 5 is a schematic diagram illustrating a sensing result sensed by the light sensing unit at another specific position.

Referring to FIGS. 3 to 5, FIG. 3 is a partial front view illustrating the display module 102 shown in FIG. 1, FIG. 4 is a schematic diagram illustrating a sensing result sensed by the light sensing unit 122 at a specific position P1, and FIG. 5 is a schematic diagram illustrating a sensing result sensed by the light sensing unit 122 at another specific position P2. As shown in FIG. 3, the optical material 1040 of the pattern layer 104 gets sparser and sparser from left to right and from top to bottom. If the optical material 1040 of the pattern layer 104 is capable of reflecting invisible light, the invisible light emitted by the light emitting unit 106 will be reflected by the optical material 1040 of the pattern layer 104. Similarly, if the optical material 1040 of the pattern layer 104 is capable of absorbing invisible light, the invisible light emitted by the light emitting unit 106 will be absorbed by the optical material 1040 of the pattern layer 104. Under the aforesaid situations, the invisible light emitted by the light emitting unit 106 just can pass through the gaps 1042 without optical material. Therefore, the sensing result sensed by the light sensing unit 122 at the specific position P1 shows a brightness distribution curve (including X-axis and Y-axis directions) as shown in FIG. 4. Similarly, the sensing result sensed by the light sensing unit 122 at another specific position P2 shows another brightness distribution curve as shown in FIG. 5. Obviously, the brightness distribution density in FIG. 4 is different from that in FIG. 5. In other words, a coordinate or a predetermined function corresponding to a specific position indicated by a user can be determined based on the brightness distribution density of the sensing result.

Figure 6:
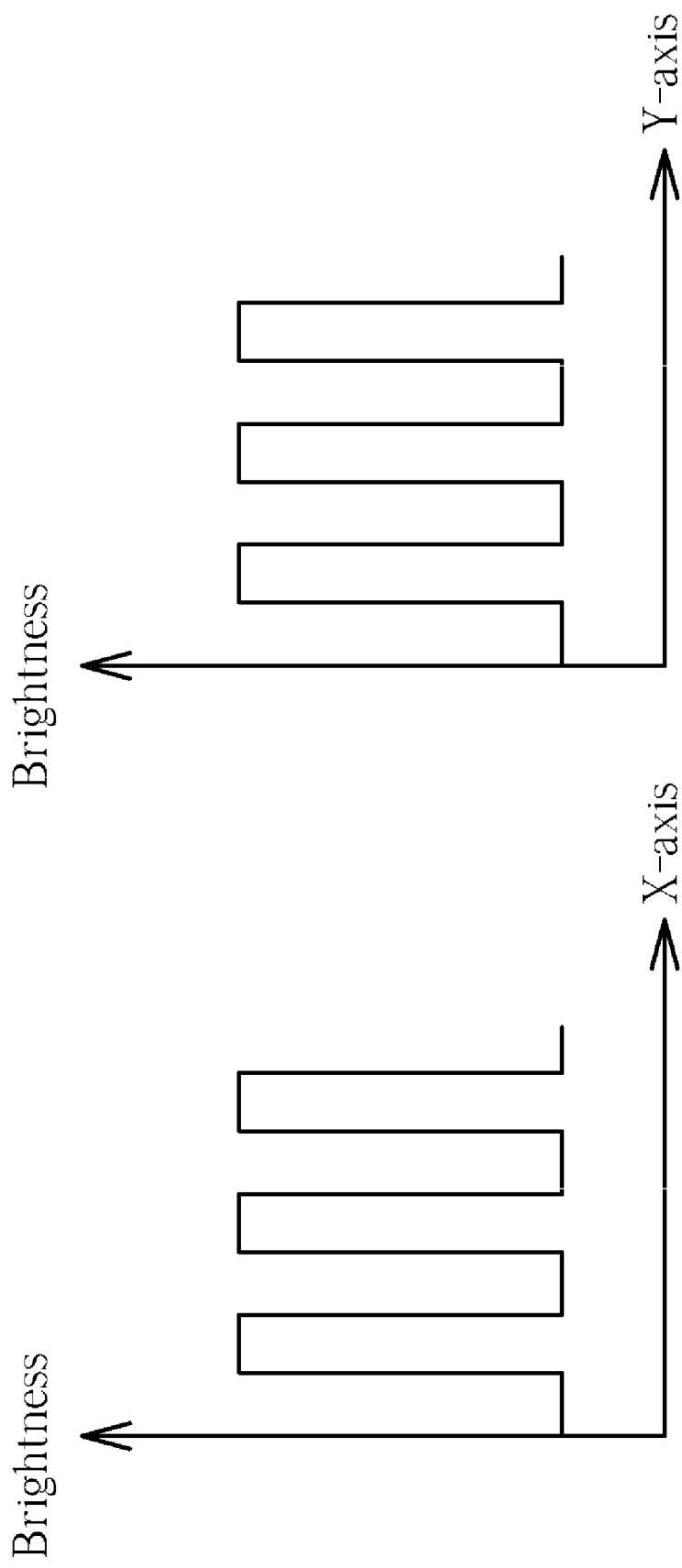
FIG. 6 is a schematic diagram illustrating a sensing result of the light sensing unit while the pattern layer has an identical light transmittance.
Figure 7:
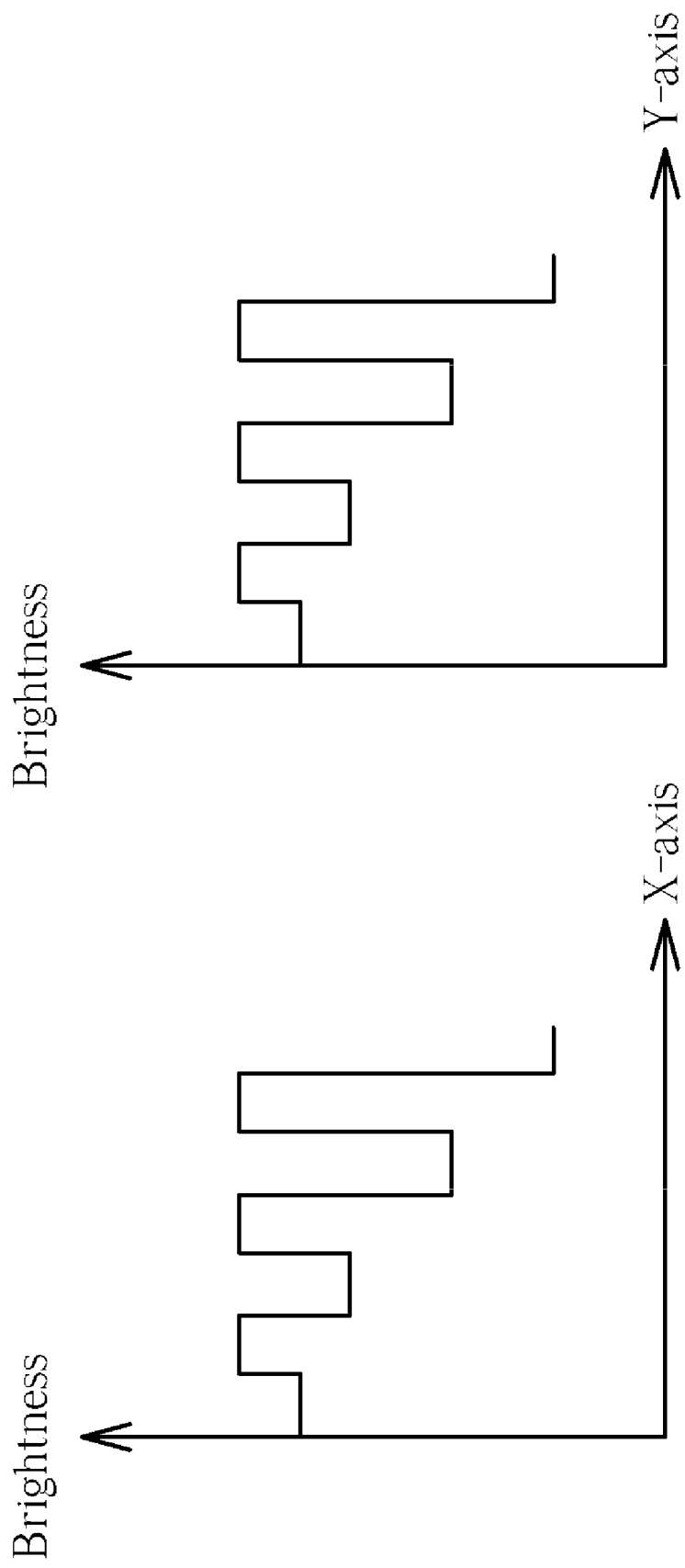
FIG. 7 is a schematic diagram illustrating another sensing result of the light sensing unit while the pattern layer has different light transmittance.

Referring to FIGS. 6 and 7, FIG. 6 is a schematic diagram illustrating a sensing result of the light sensing unit 122 while the pattern layer 104 has an identical light transmittance, and FIG. 7 is a schematic diagram illustrating another sensing result of the light sensing unit 122 while the pattern layer 104 has different light transmittance. In another embodiment of the invention, the optical material 1040 of the pattern layer 104 can be made of material allowing partial invisible light to pass through. That is to say, partial invisible light emitted by the light emitting unit 106 can pass through the optical material 1040 of the pattern layer 104. If the optical material 1040 of the pattern layer 104 has an identical light transmittance, the sensing result sensed by the light sensing unit 122 shows a brightness distribution curve (including X-axis and Y-axis directions) as shown in FIG. 6. On the other hand, if the optical material 1040 of the pattern layer 104 has different light transmittance, the sensing result sensed by the light sensing unit 122 shows a gradual brightness distribution curve as shown in FIG. 7. It should be noted that the sensing result sensed by the light sensing unit 122 also can show a non-gradual brightness distribution curve, such as in an order of high-low-high brightness, based on different arrangement of light transmittance. Furthermore, if the optical material 1040 of the pattern layer 104 has different light transmittance, the parameters, which can be used to determine a coordinate, may comprise the aforesaid brightness distribution density, brightness intensity, or a combination thereof. Accordingly, the invention can determine a coordinate indicated by a user or perform a predetermined function more accurately.

Figure 8:
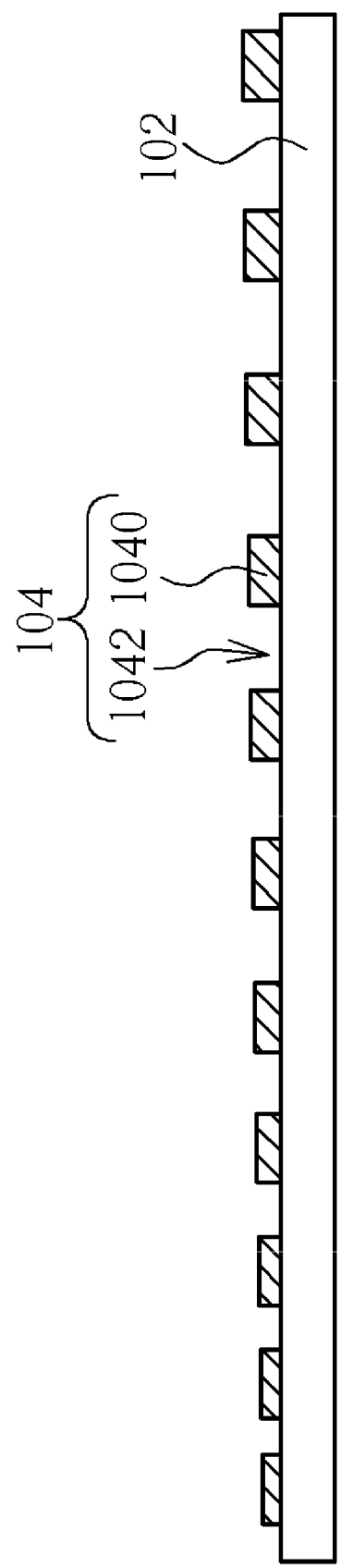
FIG. 8 is a schematic diagram illustrating that the optical material of the pattern layer has a thickness with a ratio of equality.

Referring to FIG. 8, FIG. 8 is a schematic diagram illustrating that the optical material 1040 of the pattern layer 104 has a thickness with a ratio of equality. The invention can utilize an optical material with an identical light transmittance and different thickness to change brightness intensity except the aforesaid optical material with different light transmittance. As shown in FIG. 8, the optical material of the pattern layer 104 has a thickness with a ratio of equality. Accordingly, the sensing result sensed by the light sensing unit 122 also shows a brightness distribution curve as shown in FIG. 7. Furthermore, the optical material of the pattern layer 104 also can have a thickness with a specific ratio, and it depends on practical applications.

In another embodiment of the invention, the optical material 1040 of the pattern layer 104 can be made of a combination of material capable of reflecting invisible light, material capable of absorbing invisible light, and material allowing partial invisible light to pass through instead of being independently made of material capable of reflecting invisible light, material capable of absorbing invisible light, or material allowing partial invisible light to pass through. Accordingly, the sensing result can be various types, and the coordinate or specific implication corresponding to a specific position can be obtained more accurately. That is to say, the invention can utilize the brightness distribution density, the brightness intensity, or the combination thereof of the sensing result to determine the coordinate indicated by a user or specific implication.

In another embodiment of the invention, the optical material 1040 of the pattern layer 104 also can be distributed on the display module 102 uniformly except the type shown in FIG. 3. In this embodiment, the optical material with different light transmittance or with an identical light transmittance and different thickness can be used to change the brightness intensity, so as to achieve the aforesaid sensing manner.

In practical application, the invention can establish a database in the display device 10 in advance. The database stores a plurality of absolute coordinates and sensing templates (e.g. brightness intensity distribution or pattern) corresponding to each position on the display module 102. Accordingly, the processing unit 108 can compare the sensing result (e.g. the brightness distribution shown in FIGS. 4 to 7 or pattern) of the light sensing unit 122 with the sensing templates in the database and then determines a coordinate of a specific position indicated by the pointing device 12 over the display module 102 according to the relation between the sensing templates and the absolute coordinates in the database. In another embodiment, the invention also can establish a coordinate/brightness distribution formula in the display device 10. The processing unit 108 can calculate a coordinate of a specific position by substituting the sensing result shown in FIG. 4, 5, 6, or 7 into the coordinate/brightness distribution formula. Accordingly, the display device 10 does not need to store the aforesaid sensing templates for comparison, so as to save hardware resource.

Figure 9:
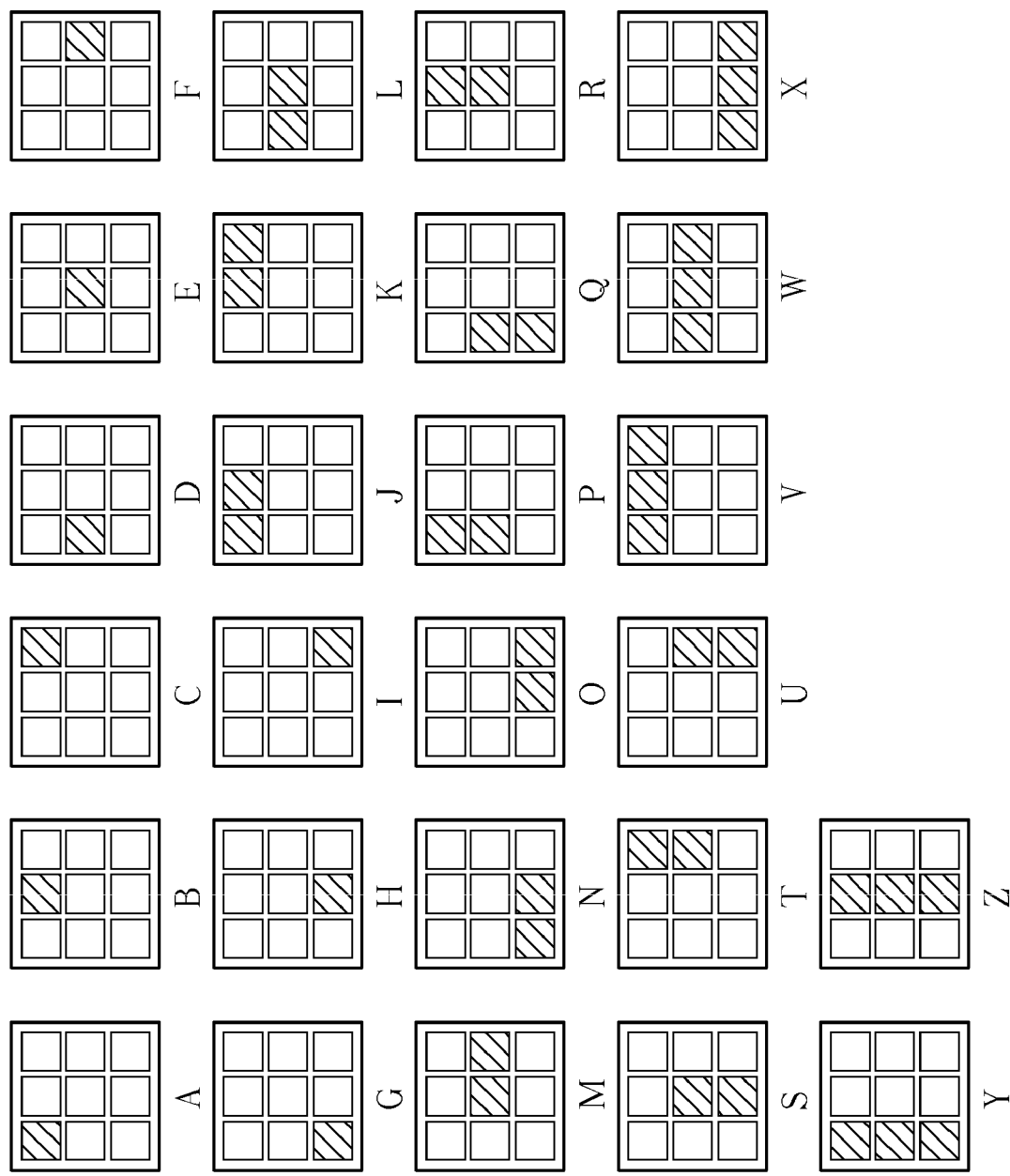
FIG. 9 is a schematic diagram illustrating a plurality of recognition templates corresponding to the pattern layer according to another embodiment of the invention.

Referring to FIG. 9, FIG. 9 is a schematic diagram illustrating a plurality of recognition templates corresponding to the pattern layer 104 according to another embodiment of the invention. In another embodiment, the invention can set a plurality of recognition templates in the pattern layer 104 in advance. As shown in FIG. 9, each of the letters A to Z is corresponding to one pre-established recognition templates, wherein the block with oblique lines is coated with material capable of reflecting invisible light, material capable of absorbing invisible light, or material allowing partial invisible light to pass through. Therefore, the invention can arrange an amount of the twenty-six recognition templates shown in FIG. 9 and then disposed the arranged recognition templates on each position of the display module 102. When the light sensing unit 122 of the pointing device 12 senses one set of recognition templates, the processing unit 108 of the display device 10 compares the set of recognition templates with a database, so as to determine a coordinate or a specific implication corresponding to the set of recognition templates. It should be noted that though the recognition templates shown in FIG. 9 are consisted of rectangular blocks, the invention is not limited to the type shown in FIG. 9. In other words, the recognition templates of the invention also can be consisted of text, symbol, image, and a combination thereof. Moreover, the amount of the recognition templates is not limited to twenty-six, and it depends on practical applications.

In another embodiment, the invention can further associate a predetermined function with a predetermined pattern of the pattern layer 104. When the light sensing unit 122 senses the predetermined pattern and outputs a sensing result to the display device 10, the processing unit 108 controls the display module 102 to display the predetermined function according to the sensing result. For example, a predetermined pattern corresponding to the specific position P1 shown in FIG. 3 can be associated with a function of "open mail". When a user moves the pointing device 12 to the specific position P1, the light sensing unit 122 senses the predetermined pattern corresponding to the specific position P1 and outputs a sensing result to the display device 10. It should be noted that the processing unit 108 can selectively control the display module 102 to display an image corresponding to the predetermined pattern, such as an image representing the function of "open mail". Afterward, the processing unit 108 controls the display module 102 to perform the function of "open mail" according to the sensing result. It should be noted that a user can associate any position of the display module 102 with a specific function correspondingly.

Furthermore, to prevent the predetermined function from being misoperated while the pointing device 12 is moving over the display module 102, the invention enables the light sensing unit 122 to output the sensing result to the display device 10 after continuously sensing the predetermined pattern for a span of time (e.g. three seconds). In other words, when the pointing device 12 is continuously moving over the display module 102, it can control the cursor to move. However, when the pointing device 12 stop at a specific position over the display module 102 for a span of time, the predetermined function corresponding to the specific position will be performed and then be displayed on the display module 102. Moreover, a user also can selectively turn on or turn off the setting regarding the predetermined function by a program.

Figure 10:
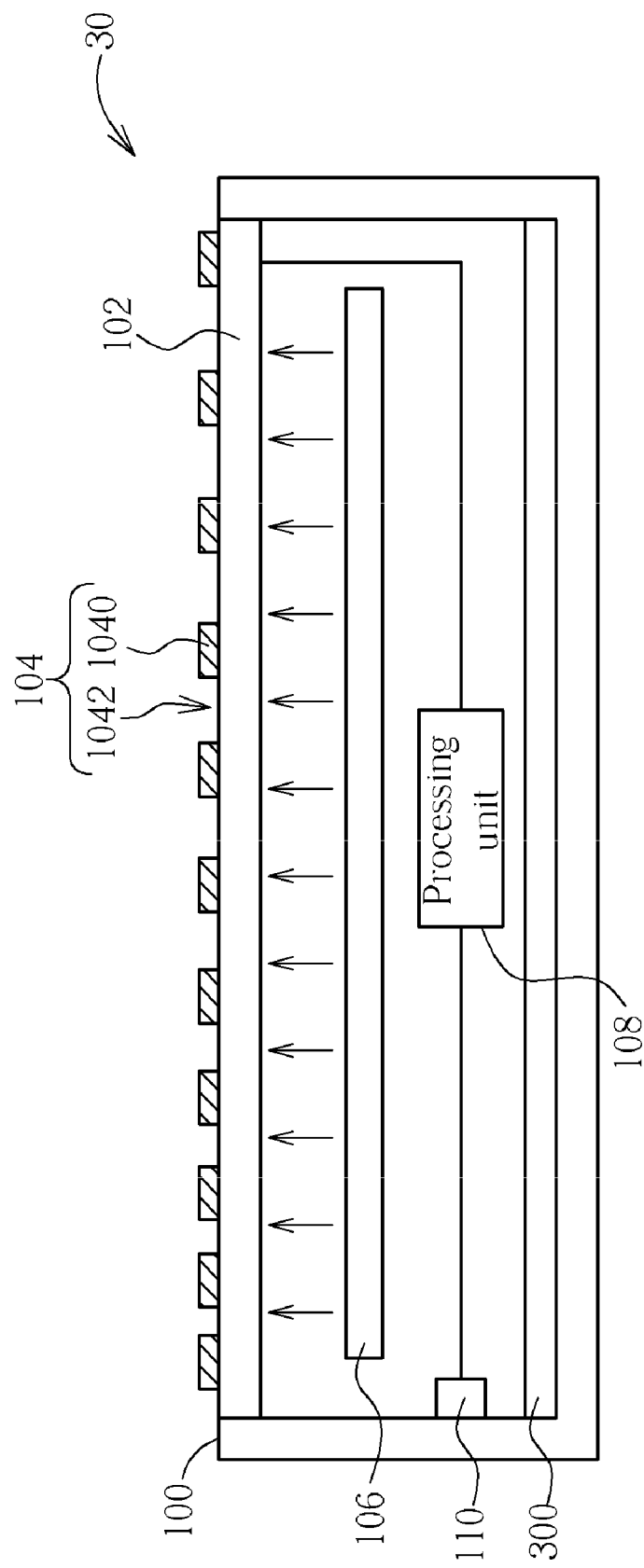
FIG. 10 is a schematic diagram illustrating the elements of a light sensing system according to another embodiment of the invention.

Referring to FIG. 10, FIG. 10 is a schematic diagram illustrating the elements of a light sensing system 30 according to another embodiment of the invention. The main difference between the display device 30 and the aforesaid display device 10 is that the display device 30 further comprises a light reflecting member 300. The light reflecting member 300 is disposed in the first casing 100 and the light emitting unit 106 is disposed between the display module 102 and the light reflecting member 300. The light emitted by the light emitting unit 106 will be reflected by the light reflecting member 300 to the display module 102, so as to enhance the brightness intensity sensed by the pointing device 12. It should be noted that the functions of the first casing 100, the display module 102, the pattern layer 104, the light emitting unit 106, the processing unit 108, and the wireless receiving unit 110 in FIG. 10 are substantially the same as those in FIG. 1, and the related description does not be described again here.

Figure 11:
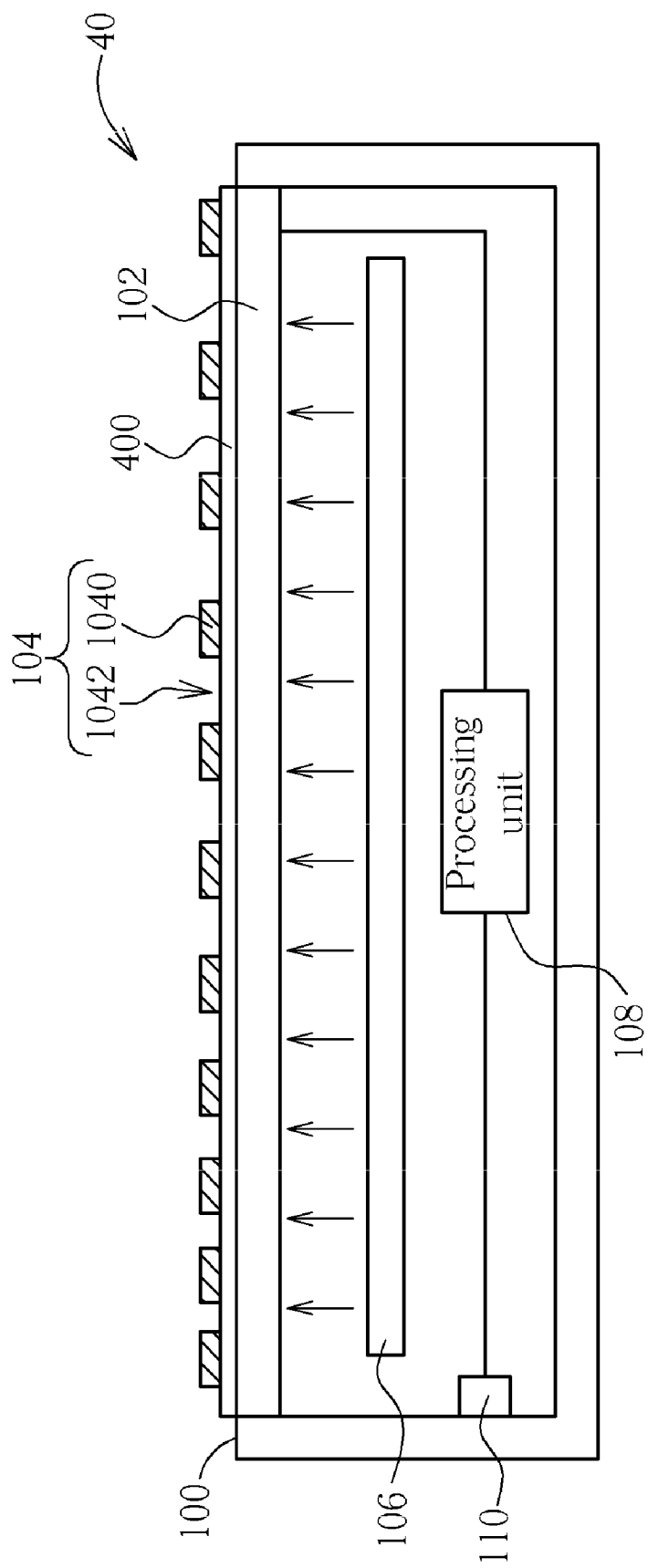
FIG. 11 is a schematic diagram illustrating the elements of a light sensing system according to another embodiment of the invention.

Referring to FIG. 11, FIG. 11 is a schematic diagram illustrating the elements of a light sensing system 40 according to another embodiment of the invention. The main difference between the display device 40 and the aforesaid display device 10 is that the display device 40 further comprises an optical film 400. The optical film 400 is attached on the display module 102 and the optical material of the pattern layer 104 is coated on the optical film 400. In practical applications, the material capable of reflecting invisible light, the material capable of absorbing invisible light, and/or the material allowing partial invisible light to pass through can be coated on the optical film 400 in advance to form the pattern layer 104. Afterward, the optical film 400 with the optical material thereon is attached onto the display module 102. It should be noted that the functions of the first casing 100, the display module 102, the pattern layer 104, the light emitting unit 106, the processing unit 108, and the wireless receiving unit 110 in FIG. 11 are substantially the same as those in FIG. 1, and the related description does not be described again here.

Compared to the prior art, the invention disposes the material capable of reflecting invisible light, the material capable of absorbing invisible light, and/or the material allowing partial invisible light to pass through on the display module of the display device, so as to form the pattern layer. Furthermore, the invention utilizes the light emitting unit within the display device or the display module itself to emit light to the pattern layer. When a user operates the pointing device with the light sensing unit over the display module, the light sensing unit senses the aforesaid brightness distribution curve (including parameters of brightness distribution density, brightness intensity, and so on), and then transmits the sensing result to the display device. Then, the processing unit of the display device obtains a coordinate or specific implication according to the sensing result. Since the invention utilizes the light emitting unit within the display device or the display module itself to emit light, the pointing device only needs to install the light sensing unit, the transmitting interface, and so on. Accordingly, the size of the pointing device can be minimized for carriage.

Those skilled in the art will readily observe that numerous modifications and alterations of the device and method may be made while retaining the teachings of the invention.

What is claimed is:

1. A display device comprising:
  a display module; and
  a pattern layer formatted on a viewing surface of the display module and being made of optical material selected from at least one material capable of absorbing invisible light and material allowing partial invisible light emitted from the display module to pass through;
  wherein the optical material of the pattern layer has position-specific invisible light transmittance,
  wherein the invisible light from the display module passing through the pattern layer of position-specific invisible light transmittance represents at least one predetermined pattern for defining a specific position on the pattern layer.

2. The display device of claim 1, wherein the pattern layer comprises patterned optical material and gaps without optical material, and the invisible light with specific wavelength is emitted out of the gaps without optical material.

3. The display device of claim 1, wherein the invisible light is infrared light.

4. The display device of claim 1, wherein the optical material of the pattern layer is distributed on the display module uniformly or in a specific density.

5. The display device of claim 1, wherein the pattern layer comprises a plurality of recognition templates.

6. The display device of claim 5, wherein the plurality of recognition templates comprises one selected from a group consisted of text, symbol, image, and a combination thereof.

7. The display device of claim 1, wherein the optical material of the pattern layer has a thickness with a ratio of equality or a specific ratio.

8. A light sensing system comprising:
  a display device comprising:
    a display module; and
    a pattern layer formatted on a viewing surface of the display device and being made of at least one optical material selected from material capable of absorbing invisible light and material allowing partial invisible light, emitted from the display module, to pass through and the pattern layer,
    wherein the optical material of the pattern layer has position-specific invisible light transmittance; and
  a pointing device comprising:
    a light sensing unit for selectively sensing the invisible light from the display module that passes through the pattern layer,
    wherein the invisible light from the display module passing through the pattern layer represents at least one predetermined pattern associated with a specific position on the pattern layer.

9. The light sensing system of claim 8, wherein the pattern layer comprises patterned optical material and gaps without optical material, and the predetermined pattern sensed by the light sensing unit is formed by the invisible light with specific wavelength emitted out of the gaps without optical material.

10. The light sensing system of claim 8, wherein the pattern layer sensed by the light sensing unit comprises a plurality of recognition templates, and the predetermined pattern is formed by arranging at least one of the plurality of recognition templates in order.

11. The light sensing system of claim 10, wherein the plurality of recognition templates comprises one selected from a group consisted of text, symbol, image, and a combination thereof.

12. The light sensing system of claim 8, wherein the predetermined pattern sensed by the light sensing unit is corresponding to a predetermined function, and the display module displays the predetermined function according to a sensing result when the light sensing unit senses the predetermined pattern and outputs the sensing result to the display device.

13. The light sensing system of claim 12, wherein the light sensing unit outputs the sensing result to the display device after continuously sensing the predetermined pattern for a span of time.

14. The light sensing system of claim 8, wherein the display device further comprises a light reflecting member disposed below the display module.

15. The light sensing system of claim 8, wherein the display device further comprises an optical film attached on the display module, and the pattern layer is coated on the optical film.

16. A display device comprising:
  a display module; and
  a pattern layer formatted on a viewing surface of the display module and being made of optical material selected from at least one material capable of absorbing invisible light and material allowing partial invisible light emitted from the display module to pass through;

wherein the optical material of the pattern layer has locational varying invisible light transmittance, wherein the invisible light from the display module passing through the pattern layer of varying locational invisible light transmittance represents at least one predetermined pattern for defining a specific position on the pattern layer.

17. The light sensing device of claim 16, wherein the pattern layer comprises optical material patterned with gaps in between, whereby the invisible light with specific wavelength is transmittable out of the gaps through the gaps.

18. The light sensing device of claim 17, wherein the pattern layer of varying locational invisible light transmittance is composed of either of different optical materials having nonidentical invisible light transmittance and an identical optical material having varying thickness.

19. The light sensing device of claim 18, wherein the pattern layer comprises an optical material pattern having either of a uniform distribution and a specific distribution density.

20. The light sensing device of claim 18, the pattern layer being composed of an identical optical material having varying thickness, wherein the optical material of the pattern layer has a thickness with a constant varying ratio.

* * * * *